(12) United States Patent  
Schwegman

(10) Patent No.: US 8,640,925 B1  
(45) Date of Patent: Feb. 4, 2014

(54) DIVOT FILL/REPAIR APPARATUS

(76) Inventor: Katie R. Schwegman, Bloomington, MN (US)

(*) Notice: Subject to any disclaimer, the term of this patent is extended or adjusted under 35 U.S.C. 154(b) by 906 days.

(21) Appl. No.: 12/685,105

(22) Filed: Jan. 11, 2010

(51) Int. Cl.
  *B67D 7/84* (2010.01)

(52) U.S. Cl.
  USPC .......... 222/175; 222/449; 222/451; 222/306; 222/564; 222/377; 222/460

(58) Field of Classification Search
  USPC ......... 222/175, 449, 451, 306, 612, 564, 377, 222/460
  See application file for complete search history.

(56) References Cited

U.S. PATENT DOCUMENTS

| 249,464 | A | * | 11/1881 | Farnham | 222/439 |
| 1,844,260 | A | * | 2/1932 | Nicolino | 222/440 |
| 5,339,994 | A | * | 8/1994 | Nuila | 222/175 |
| 5,402,915 | A | * | 4/1995 | Hogan | 222/105 |
| 5,503,090 | A | * | 4/1996 | Guzan | 111/7.2 |
| 5,503,093 | A | * | 4/1996 | Katou | 112/103 |
| 6,082,589 | A | * | 7/2000 | Ash et al. | 222/146.6 |
| 6,637,355 | B2 | * | 10/2003 | Springs | 111/95 |

\* cited by examiner

*Primary Examiner* — Kevin P Shaver  
*Assistant Examiner* — Nicholas J Weiss  
(74) *Attorney, Agent, or Firm* — David Alan Lingbeck

(57) ABSTRACT

A divot fill/repair apparatus for filling and repairing divots in the turf. The divot fill/repair apparatus includes a container assembly capable of being carried on a user's back, and a dispensing assembly being supported by the container assembly for dispensing fill material to fill and/or repair divots.

3 Claims, 3 Drawing Sheets

DIVOT FILL/REPAIR APPARATUS

BACKGROUND OF THE INVENTION

1. Field of the Invention

The present invention relates to turf material dispensers and more particularly pertains to a new divot fill/repair apparatus for filling and repairing divots in the turf.

2. Description of the Prior Art

The use of turf material dispensers is known in the prior art. More specifically, turf material dispensers heretofore devised and utilized are known to consist basically of familiar, expected and obvious structural configurations, notwithstanding the myriad of designs encompassed by the crowded prior art which have been developed for the fulfillment of countless objectives and requirements.

While these devices fulfill their respective, particular objectives and requirements, the aforementioned patents do not disclose a new divot fill/repair apparatus.

The prior art includes a seed dispensing device comprising a housing having a dispensing end, a spring-loaded rod disposed in the lower end, a valve member which releaseably engages a valve seat in the lower end of the housing. Another prior art includes a divot repair device comprising a hopper, a wheeled carrier and dispensing valve connected to the hopper for dispensing the fill material. Also, another prior art includes a granular fertilizer spreader comprising a container, a flexible tube connected to the container, a distributor head connected to the rigid tube, a valve disposed between the flexible and rigid tube, and shoulder straps for carrying the container. Further, another prior art includes a bag with shoulder straps, telescopic tubes being connected to the bag and cutoff and fed valves with a lever and spring being disposed in the tubes for dispensing seed and fertilizer.

SUMMARY OF THE INVENTION

The general purpose of the present invention, which will be described subsequently in greater detail, is to provide a new divot fill/repair apparatus which has many of the advantages of the turf material dispensers mentioned heretofore and many novel features that result in a new divot fill/repair apparatus which is not anticipated, rendered obvious, suggested, or even implied by any of the prior art turf material dispensers, either alone or in any combination thereof. The present invention includes a container assembly capable of being carried on a user's back, and a dispensing assembly being supported by the container assembly for dispensing fill material to fill and/or repair divots. None of the prior art includes the combination of the elements of the present invention.

There has thus been outlined, rather broadly, the more important features of the divot fill/repair apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new divot fill/repair apparatus which has many of the advantages of the turf material dispensers mentioned heretofore and many novel features that result in a new divot fill/repair apparatus which is not anticipated, rendered obvious, suggested, or even implied by any of the prior art turf material dispensers, either alone or in any combination thereof.

Still another object of the present invention is to provide a new divot fill/repair apparatus for filling and repairing divots in the turf.

Still yet another object of the present invention is to provide a new divot fill/repair apparatus that effectively and efficiently reduces the amount of time to fill divots.

Even still another object of the present invention is to provide a new divot fill/repair apparatus that controls the dispensing of the fill directly in the divot thus reducing the possibility of wasting the fill.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
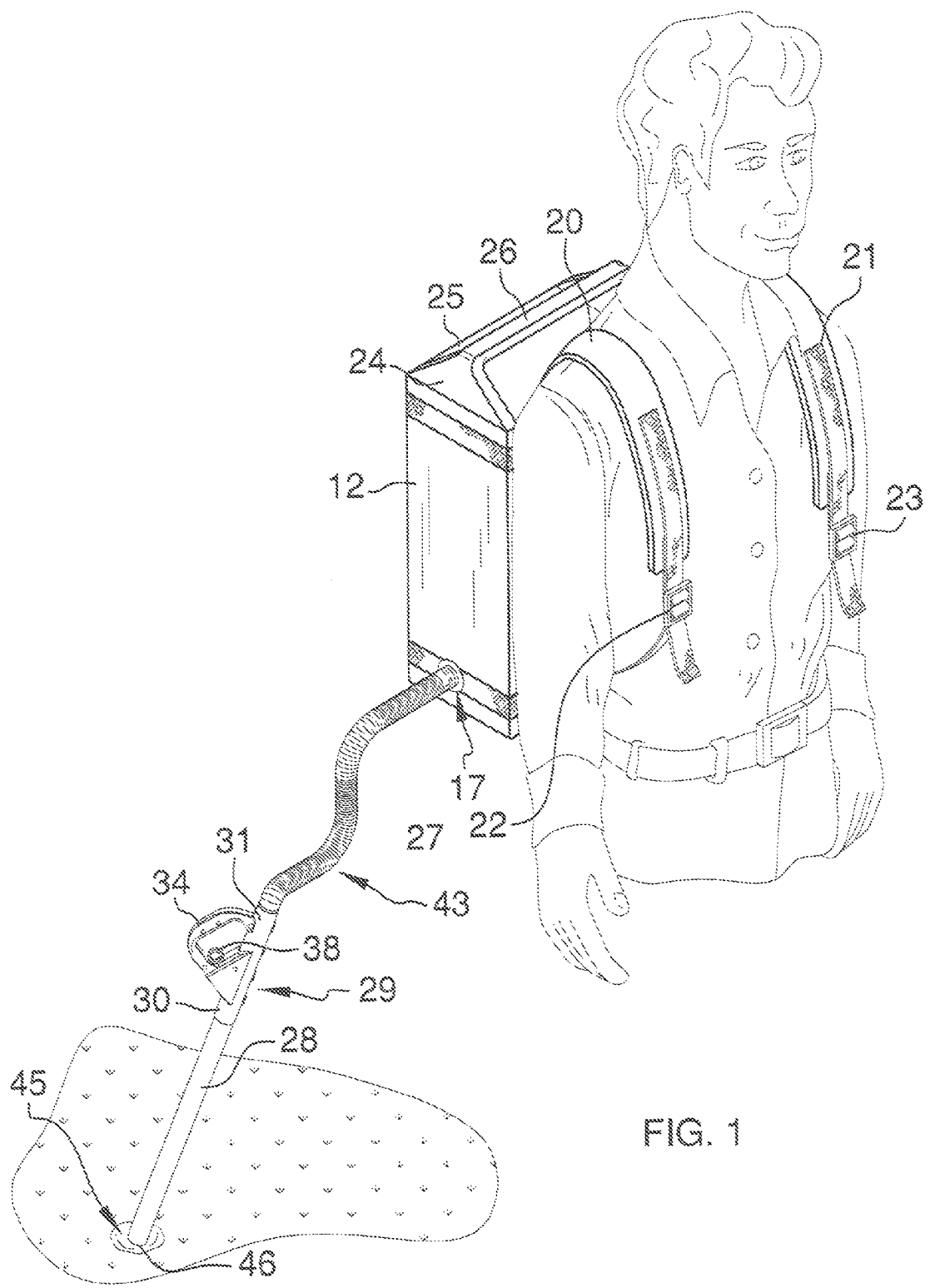
FIG. 1 is a perspective view of a new divot fill/repair apparatus according to the present invention.
Figure 2:
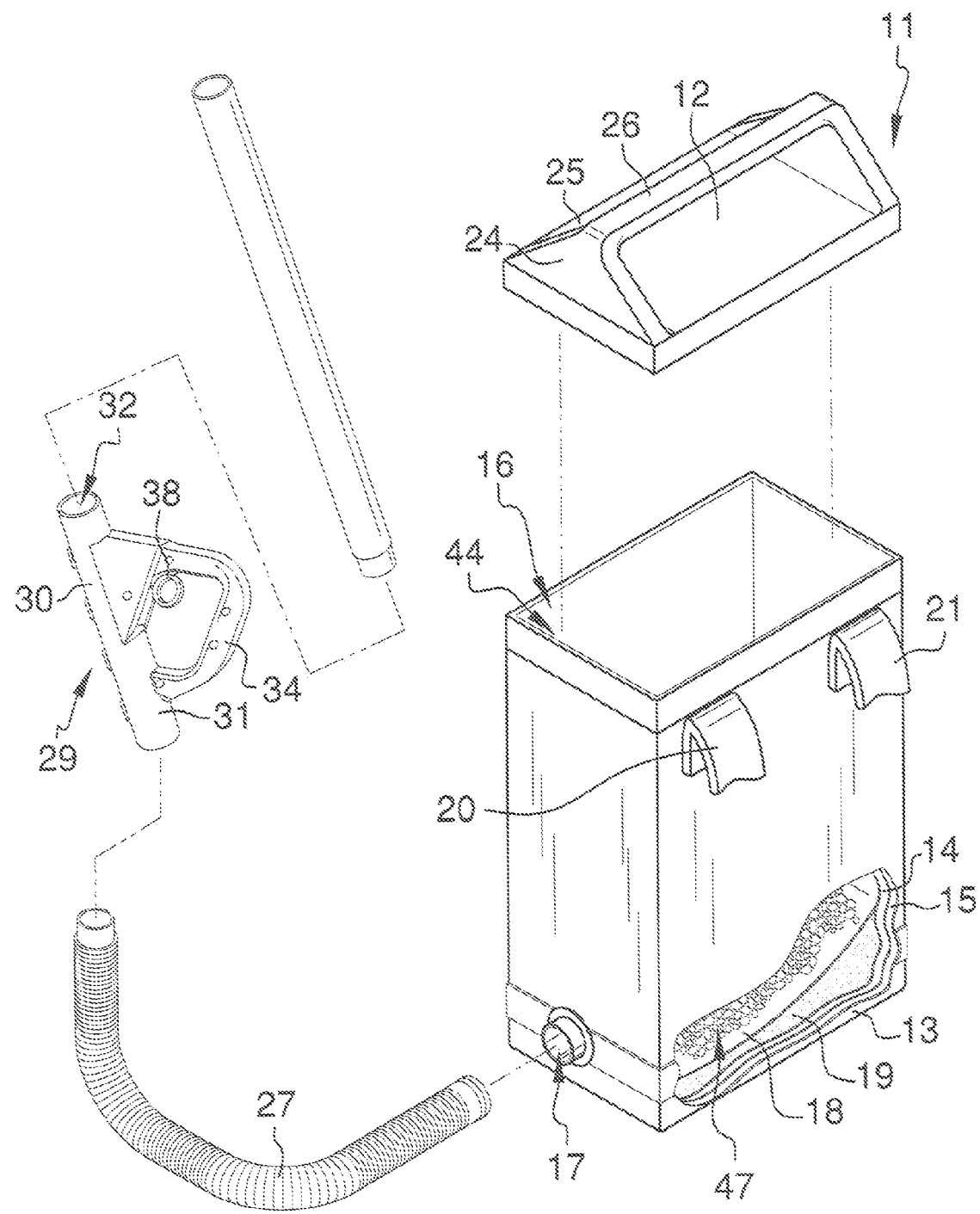
FIG. 2 is an exploded perspective view of the present invention.
Figure 3:
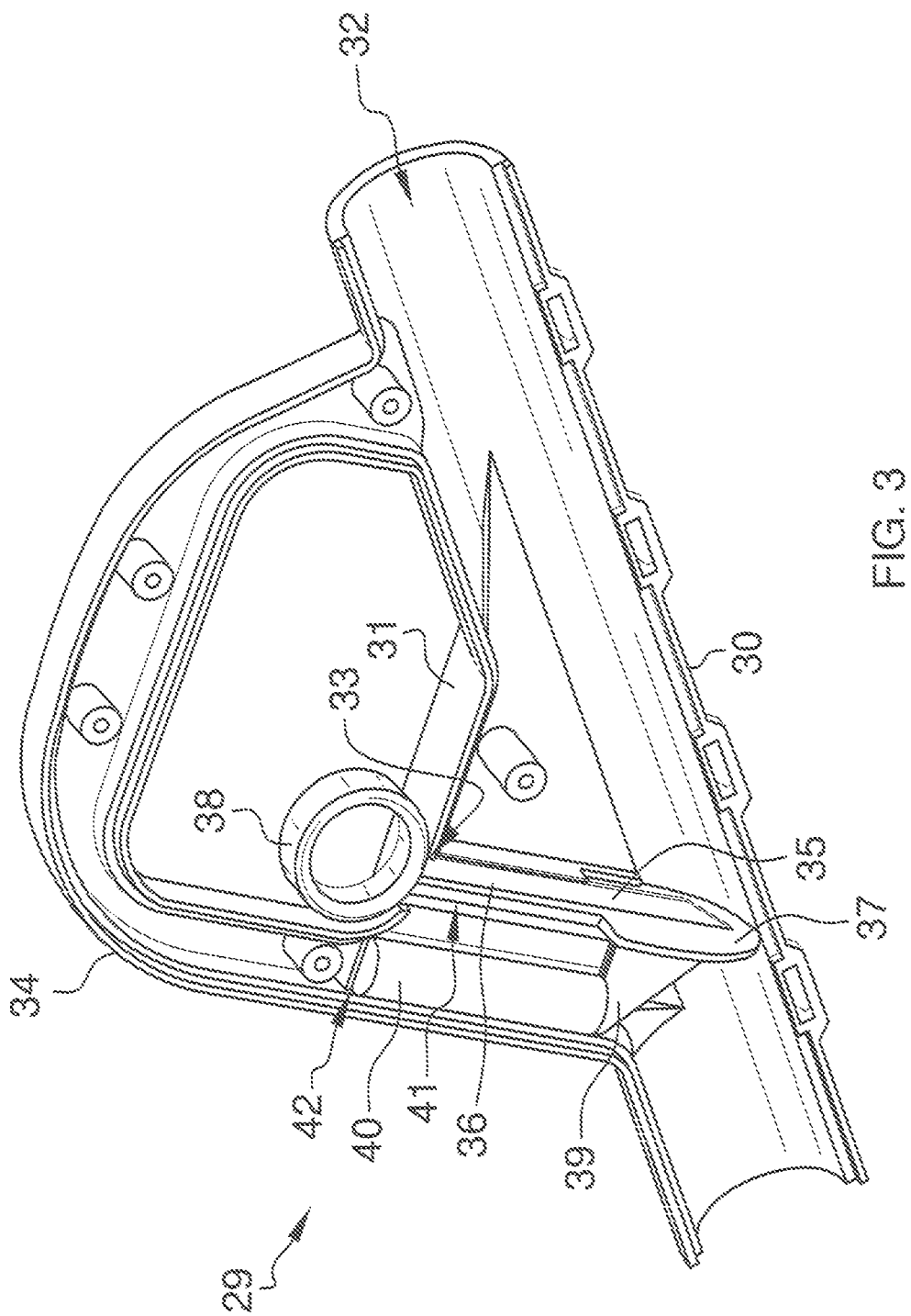
FIG. 3 is a cross-sectional perspective view of the present invention.

With reference now to the drawings, and in particular to FIGS. 1 through 3 thereof, a new divot fill/repair apparatus embodying the principles and concepts of the present invention and generally designated by the reference numeral 10 will be described.

As best illustrated in FIGS. 1 through 3, the divot fill/repair apparatus 10 generally comprises a container assembly 11 capable of being carried on a user's back, and a dispensing assembly 43 being supported by the container assembly 11 for dispensing fill material 47 to fill and/or repair divots 45. The container assembly. 11 includes a container 12 having perimeter walls 13-15, an open top 16, a compartment 44 for receiving and holding fill material 47, and an opening 17 being disposed through one of the perimeter walls 13-15 and into the compartment 44 near a bottom of the container 12. The compartment 44 has a bottom which is defined by the perimeter walls 13-15. The bottom of the compartment 44 is a slide 18 which has a substantially non-resistant smooth surface and is sloped upwardly in a direction away from the opening 17 to facilitate gravitational flow of the fill material 47 to the opening 17 for the dispensing of the fill material 47 to the divots 45. The container 12 further includes support material 19 such as lightweight foam material being conventionally disposed under the slide 18 with the slide 18 being disposed upon the support material 19 and being curved upwardly in a direction away from the opening 17 rather than the slide 18 simply being a straight line to optimize the volume of the compartment 44 so that the compartment 44 can contain more fill material 47.

The perimeter walls 13-15 of the container 12 include an outer layer 13 of fabric material for providing a cushion for a user carrying the container 12 on one's back. The perimeter walls 13-15 also include an inner layer 14 of rigid material having a smooth or slippery surface to facilitate the sliding of the fill material 47 to the opening 17. Further, the perimeter walls 13-15 include a middle layer 15 of semi-flexible material being conventionally disposed between the inner and outer layers 13,14.

The container assembly 11 also includes a lid 24 being removably disposed over the open top 16 of the container 12 with the lid 24 having a wall 25 and a handle 26 being conventionally attached to the wall 25. The container assembly 11 further includes adjustable shoulder straps 20,21 having ends being conventionally attached to the container 12 and having adjustable buckles 23,24 for adjusting the length of the shoulder straps 20,21.

The dispensing assembly 43 includes a flexible tubular member 27 having an end being detachably and conventionally attached about the opening 17 of the container 12, and also includes a valve assembly 29 being removably, fluidly and conventionally connected to the flexible tubular member 27, and further includes a rigid tubular member 28 being removably, fluidly and conventionally connected to the valve assembly 29 and having a length capable of engaging the ground and dispensing the fill material 47 into the divot 45 upon the container 12 being carried upon the user's back for dispensing the fill material 47 to the divots 45. The valve assembly 29 includes a tubular section 30 having a wall 31 and a hole 33 being disposed through the wall 31 of the tubular section 30 with the tubular section 30 being removably, fluidly and conventionally connected to the flexible and rigid tubular members 27,28, and also includes a handle member 34 being conventionally attached to the tubular section 30, and further includes a valve member 35 being biasedly disposed in the tubular section 30 to open and close the passageway 32 through the tubular section 30 to regulate dispensing of the fill material 47 from the container 12 to the divot 45. The valve member 35 includes a shaft 36 being movably disposed through the hole 33 of the tubular section 30, and also includes a plug 37 such as a plate being conventionally attached to the shaft 36 and being removably disposed in the passageway 32 of the tubular section 30 with the plate being generally perpendicular to a longitudinal axis of the passageway 32, and further includes a plug-removing member 38 being conventionally attached to the shaft 36 for moving the valve member 35 and moving the plug 37 relative to the passageway 32 of the tubular section 30. The valve assembly 29 also includes a biased member 40 such as an expansion spring being engaged to the valve member 35 to bias the plug 37 to substantially block the passageway 32 of the tubular section 30 to prevent dispensing of the fill material 47 through the rigid tubular member 28. The valve member 35 also includes a bracket 39 being movable with and conventionally attached to and extending generally perpendicular to the plug 37 and being engaged to the biased member 40. The valve assembly 29 further includes a bore 41 being aligned with the hole 33 and being disposed into the passageway 32 of the tubular section 30 and also includes a cavity 42 being partially disposed in the tubular section 30 and in the handle member 34. The shaft 36 is slidably disposed in the bore 41 and the biased member 40 is movably disposed in the cavity 42. The plug-removing member 38 is a finger loop being disposed between the handle member 34 and the tubular section 30.

In use, fill material 47 which is generally a sand-based granular material to germinate turf growth is put into the container 12, and the container 12 is then strapped on the user's back. The user walks around a selected piece of ground such as a playing field including a golf course and upon locating a divot 45, the user positions an open end 46 of the rigid tubular member 28 in the divot 45; and dispenses a quantity of the fill material 47 into the divot 45 necessary to fill and/or repair the divot 45. In particular, the user actuates the valve assembly 29 to dispense into the divot 45 only the quantity necessary to fill and/or repair the divot 45.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the divot fill/repair apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A divot fill/repair apparatus comprising: a container assembly being adapted to be removably carried on a user's back and including a container having a compartment being disposed inside thereof for receiving and holding fill material, and an opening disposed into said compartment, and a dispensing assembly supported by said container assembly for controllably dispensing fill material in divots, said dispensing assembly including a flexible tubular member detachably attached about said opening, and also including a valve assembly removably and fluidly coupled to said flexible tubular member, said valve assembly including a tubular section having a wall and a hole disposed through said wall, and also including a handle member attached to said tubular section and further including a valve member biasedly disposed in said tubular section to open and close a passageway through said tubular section to regulate dispensing of the fill material from said container to the divot, said valve member including a shaft movably disposed through said hole of said tubular section, and also including a plug being attached to said shaft and removably disposed in the passageway of said tubular section, said valve assembly also including a biased member engaged to said valve member to bias said plug to substantially block the passageway of said tubular section to prevent dispensing of the fill material through said rigid tubular member, said valve assembly further including a bore aligned with said hole and extended into said passageway of said tubular section and also including a cavity being partially disposed in said tubular section and in said handle member, said shaft slidably disposed in said bore and said biased member movably disposed in said cavity.

2. The divot fill/repair apparatus as described in claim 1, wherein said valve member also includes a plug-removing member being attached to said shaft for moving said valve member and moving said plug relative to the passageway of said tubular section, wherein said plug-removing member is a finger loop being disposed between said handle member and said tubular section.

3. The divot fill/repair apparatus as described in claim 2, wherein said plug is a plate being disposed generally perpendicular to a longitudinal axis of the passageway of said tubular section.

* * * * *